United States Patent Office 2,848,467
Patented Aug. 19, 1958

2,848,467

FATTY ACID DERIVATIVE

Joseph Nichols, Princeton, and Edgar S. Schipper, Highland Park, N. J., assignors to Ethicon, Inc., a corporation of New Jersey No Drawing. Application July 5, 1957
Serial No. 669,926

1 Claim. (Cl. 260—406)

This invention relates to 12-keto-9-octadecynoic acid and salts thereof and has among its objects the provision of such compounds.

U. S. Patent No. 2,623,888, December 30, 1952, discloses the preparation of 12-keto oleic acid and its cis-trans isomer 12-keto elaidic acid and esters thereof, by the oxidation of the 12-hydroxy group of ricinoleic and ricinelaidic acids and their esters to a 12-keto group by means of chromic acid, preferably in the presence of sulphuric acid, all reactants being in solution in glacial acetic acid. It was found that an excess of chromic acid over the stoichiometric amount for oxidation of the 12-hydroxy group to the 12-keto group was necessary in order to obtain optimum yields of the desired product.

It has now been discovered that ricinostearolic acid may be oxidized with chromic acid in acetic acid solution to provide 12-keto-9-octadecynoic acid, having the formula:

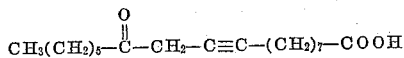

The presence in the reaction mixture of an excess of chromic acid over the stoichiometric amount for oxidation of the 12-hydroxy group to the 12-keto group as well as the presence of some free sulfuric acid has a substantial effect on the course of the oxidation and enables optimum yield of the keto acid to be obtained. Glacial acetic acid in which the reactants are dissolved acts as a solvent and provides a single phase reaction medium. It is preferred that the volume of glacial acetic acid be such that the temperature of the reaction may be closely controlled; by proper adjustment of the volume of acetic acid, the oxidation proceeds to completion without the external application of heat.

For the purpose of illustrating the invention, Example I is set forth below to show the method of preparing 12-keto-9-octadecynoic acid by the oxidation of ricinostearolic acid; however, it is to be understood that this example is set forth by way of illustration and not by way of limitation.

Example I

An oxidizing solution containing 1.6 grams of sodium dichromate dihydrate, 1.6 ml. of water, 0.5 ml. of concentrated sulfuric acid and 13 ml. of glacial acetic acid was added with stirring to a solution of 2 grams of ricinostearolic acid in 16 ml. of glacial acetic acid. During the course of the addition the temperature of the reaction mixture rose to 49° C. The reaction mixture was rapidly poured into 75 ml. of ice-water two minutes after addition of the oxidizing solution to the solution of ricinostearolic acid was completed. The reaction product precipitated when the reaction mixture was poured into the ice-water and was removed by filtration, and washed free of soluble salts. 1.9 grams of reaction product, having a melting point of 62–64° C. were obtained. The crude reaction product was recrystallized three times from 180 ml. of petroleum ether (B. P. 30–60° C.) and the melting point of the recrystallized material was constant at 63–64° C. Carbon and hydrogen analyses gave the following results:

Calculated for $C_{18}H_{30}O_3$: carbon=73.43; hydrogen=10.27. Found: carbon=73.19; hydrogen=10.39.

The ultra-violet absorption spectrum of 12-keto-9-octadecynoic acid prepared according to this example showed an absorption band with a maximum of 2780 A. and an end absorption at 2050 A. and molecular coefficients of extinction at those wavelengths of 617 and 133, respectively.

The ricinostearolic acid in the example was prepared according to the directions of Muhle, Ber. 46, 2091 (1913) and had a melting point after recrystallization from petroleum ether of 50–51° C.

The novel acid 12-keto-9-octadecynoic acid and its salts may be used for a number of different purposes in a wide variety of fields. They may be employed as intermediates in further chemical syntheses or as finished products. In the latter they find use in the inhibition of the growth of fungi and mycobacteria. As an intermediate, the acid may be converted into amides or reacted with alcohols to make esters.

Example II

The compound prepared according to the above example was tested for bactericidal activity by the following serial dilution method.

The compound was sterilized by exposure to propylene oxide for three days and 0.5 milliliter of sterile aqueous solution containing twenty milligrams of compound per milliliter of solution was added to 9.5 milliliters of sterile yeast beef broth, the broth then being serially diluted with additional sterile broth, to provide solutions of five milliliters total volume containing 1000, 500, 200, 100, 50, 10, 1, 0.1, and 0.01 micrograms of compound per milliliter of solution. Two tubes, each containing 4.5 milliliters of sterile broth, were inoculated with 0.1 milliliter of a mature broth culture of *Micrococcus aureus* and *Micrococcus albus*, respectively, and the inoculated tubes were incubated at 37° C. for 24 hours. Progressive series of dilutions ranging from 1 to 100, to 1 to 1 billion, were prepared by dilution of the contents of the two tubes with sterile broth and 0.1 milliliter of each dilution was transferred into 4.5 milliliters of sterile broth and incubated at 37° C. for 24 hours. 0.1 milliliter of the contents of the tubes representing the highest dilution which initiated growth of the organisms were each transferred into each of the tubes containing the compound to be tested and this was followed by incubation of the tubes at 37° C. for 48 hours. The compound completely inhibited the growth of both organisms at a concentration of 500 micrograms per milliliter.

The compound of this invention was tested for activity against both Mycobacterium tuberculosis H37R$_a$ and Mycobacterium tuberculosis H37R$_v$ according to the method of A. W. Frisch and M. S. Tarshis, American Review of Tuberculosis, vol. 64, page 551 (1951). The compound completely inhibited the growth of both of these mycobacteria at a concentration of 100 micrograms per milliliter.

The compound prepared according to Example I was tested for activity against *Coccidioides immitis*, *Candida albicans* and *Cryptococcus neoformans* by a serial dilution method given by the following procedure:

The compound was sterilized by exposure to propylene oxide for three days and 0.25 milliliter of sterile aqueous solution containing twenty milligrams of compound per milliliter of solution was added to 4.5 milliliters of sterile Mycophil broth, the broth then being serially diluted with additional sterile broth to provide solutions of five milliliters total volume containing 1000, 500, 100, 10, 1, 0.1, and 0.01 micrograms of compound per milliliter of solution. One milliliter portions of seventy-two hour Mycophil broth cultures of each of these fungi were added to ninety-nine milliliter portions of sterile Mycophil broth and 0.2 milliliter portions of the diluted cultures were added to each of the serial dilutions containing the test compound and the inoculated tubes were incubated at 25° C. for five days. The compound completely inhibited the growth of *Coccidioides immitis*, *Candida albicans* and *Cryptococcus neoformans* at a concentration of 1000 micrograms per milliliter.

This application is a continuation-in-part of our application Serial No. 413,464, filed March 1, 1954, now abandoned.

It is apparent that many widely different embodiments of this invention may be made without departing from the spirit and scope thereof; and, therefore, it is not intended to be limited except as indicated in the appended claim.

What is claimed is:

12-keto-9-octadecynoic acid.

No references cited.